Figure 1:
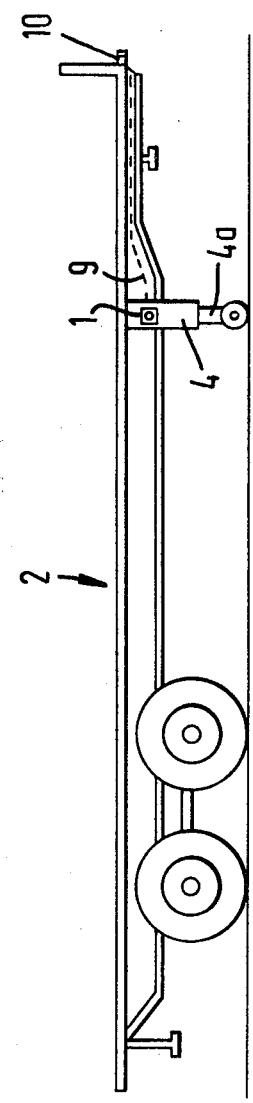

United States Patent [19]

Busby

[11] 4,345,779
[45] Aug. 24, 1982

[54] DRIVE MECHANISM FOR A VEHICLE TRAILER LIFTING GEAR

[76] Inventor: Philip V. Busby, 13 Brunel Ave., Neyland, near Milford Haven, Dyfed, England

[21] Appl. No.: 160,301

[22] Filed: Jun. 17, 1980

[30] Foreign Application Priority Data

Jun. 20, 1979 [GB] United Kingdom ............... 7921471

[51] Int. Cl.³ .............................................. B60S 9/08
[52] U.S. Cl. .................................................. 280/766
[58] Field of Search ............... 280/766, 764, 765, 421, 280/427; 254/86 R

[56] References Cited

U.S. PATENT DOCUMENTS

| | | | |
|---|---|---|---|
| 3,182,956 | 5/1965 | Dalton | 280/766 X |
| 3,729,212 | 4/1973 | Clafin et al. | 254/86 R |
| 3,784,160 | 1/1974 | Phillips | 280/766 X |
| 3,895,682 | 7/1975 | Graham | 280/766 |
| 4,129,322 | 12/1978 | Kuntz | 280/766 |

FOREIGN PATENT DOCUMENTS 706288  3/1965  Canada ............................ 280/766

Primary Examiner—John A. Pekar
Attorney, Agent, or Firm—Ward, Lalos, Leeds, Keegan & Lett

[57] ABSTRACT

Drive mechanism is provided for mechanically actuating support legs of a vehicle trailer lifting gear. The mechanism includes a rotary drive unit 1 driven by air under pressure supplied from a vehicle for drawing the trailer. The unit 1 has a drive socket 7 engaging a corresponding shaped nut 6 welded to a shaft 5 engaging gearing controlling extension and retraction of telescopic support legs 4a.

11 Claims, 4 Drawing Figures

DRIVE MECHANISM FOR A VEHICLE TRAILER LIFTING GEAR

BACKGROUND OF THE INVENTION

This invention relates to a drive mechanism for a vehicle trailer lifting gear and to a vehicle trailer provided with such a mechanism. The drive mechanism is suitable for a vehicle trailer lifting gear, hereinafter termed "of the kind defined", in which telescopic support legs are provided, at the trailer end couplable to a vehicle, for supporting the uncoupled trailer end relative to the ground and operable via a rotatable shaft and gearing, to vary the height of said trailer end to permit coupling to or uncoupling from a vehicle. Generally such support legs are wheeled.

Conventionally lifting gear of the kind defined is operated manually by turning a handle attachable to one end of the rotatable shaft, thus extending or retracting the support legs as desired via the gearing acting on the legs. Such manual operation is both time consuming and tiring to the operator and can cause undesirable delays in coupling and uncoupling the trailer and vehicle. Whilst proposals have been made to provide mechanical drive means for the lifting gear such as by substituting hydraulic piston and cylinder or air ram assemblies for the gear driven telescopic legs, such proposals have not provided an economic or effective solution to the problem. In particular such proposals require expensive easily damaged components and the existing sturdy conventional lifting gear legs have to be removed from the trailer before these components can be fitted.

There is thus a need for a generally improved drive mechanism for vehicle trailer lifting gear of the kind defined which can be fitted to existing trailers with minimum alteration.

According to one aspect of the present invention there is provided drive mechanism for a vehicle trailer lifting gear of the kind defined, including an air driven rotary drive unit fixedly attachable to the vehicle trailer and connectible to a source of air under pressure, and means for drivingly connecting the drive unit to one end of the rotatable shaft so that with the mechanism in operative association with the vehicle trailer the drive unit can be connected to the source of air pressure to rotate the shaft one way or the other to extend or retract the support legs.

According to another aspect of the present invention there is provided a vehicle trailer having lifting gear of the kind defined and drive mechanism as hereinbefore described, in which the nut is welded to said one end of the rotatable shaft, the drive unit is bolted to the bracket, the bracket is welded to one of the support legs with the socket in engagement with the nut, the air hose is connected at one end to the drive unit and at the other end to the male hose coupling and the male hose coupling attached to the trailer connected board for connection to a secondary air braking system of a vehicle.

For a better understanding of the present invention and to show how the same may be carried into effect, reference will now be made, by way of example, to the accompanying drawings.

THE DRAWINGS

Figure 2:
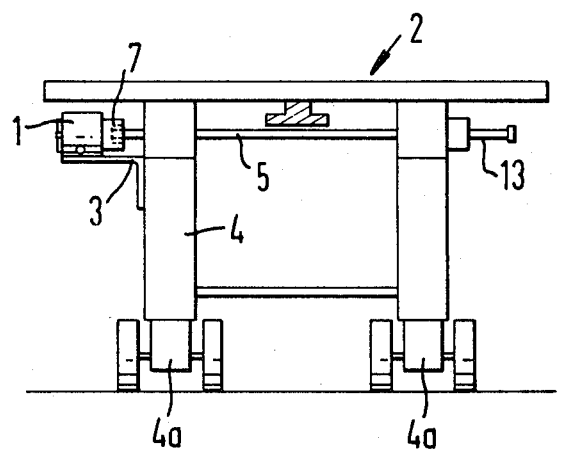
Figure 4:
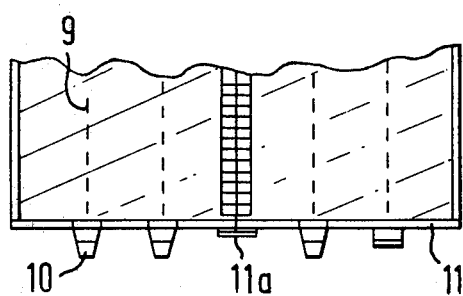
Figure 4:
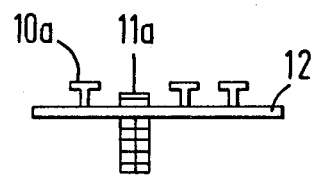
Figure 3:
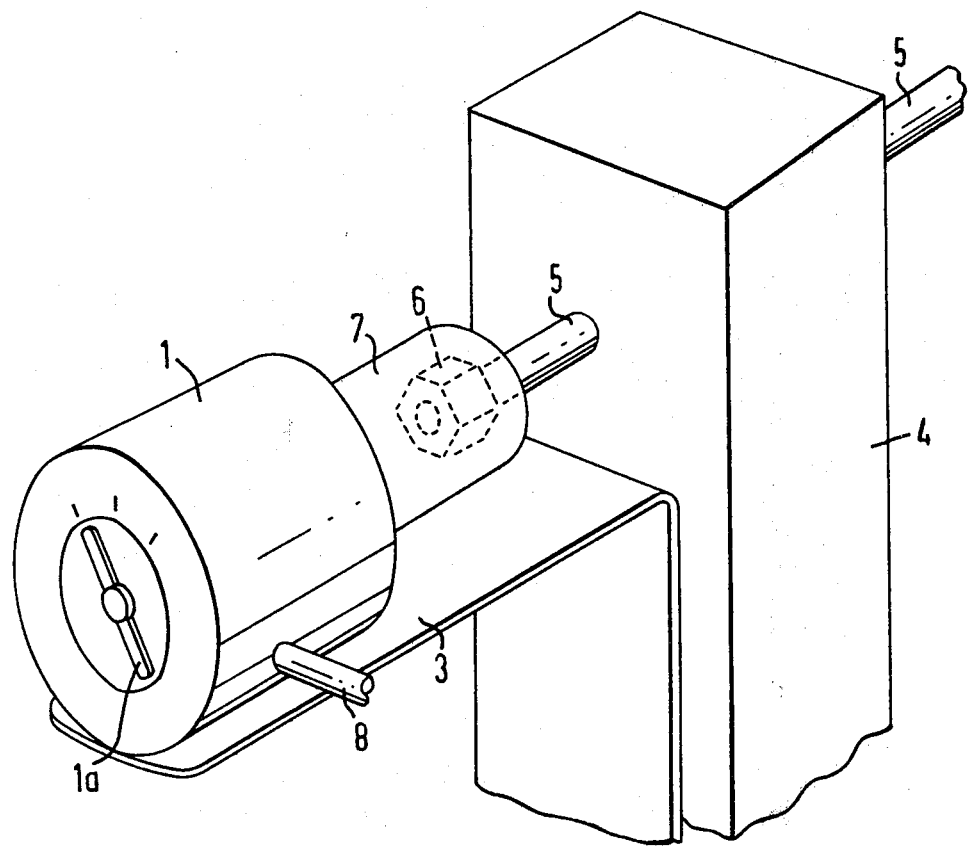

FIG. 1 is a side view of a vehicle trailer incorporating a lifting gear drive mechanism according to the invention, FIG. 2 is an end view for the trailer of FIG. 1, FIG. 3 is a perspective view to a larger scale of a detail of the drive mechanism of the invention, and FIG. 4 is a plan view of a connector board of the trailer of FIGS. 1 and 2 in operative association with a corresponding connector board on a vehicle for towing the trailer.

Referring now to the accompanying drawings, a drive mechanism of the invention for a vehicle trailer lifting gear of the kind defined is shown basically in FIG. 3. This mechanism includes an air driven rotary drive unit 1 of any suitable kind, which preferably is in the form of a reversible socket gun such as generally used as a power driven spanner for example for tightening or loosening vehicle wheel nuts. Thus unit 1 is fixedly attachable to a vehicle trailer 2 in any suitable manner such as via a bracket 3 to which it may be bolted, which bracket is attached, for example, to a support leg casing 4 of the lifting gear such as by being welded thereto.

DESCRIPTION OF THE INVENTION

The mechanism includes means for drivingly connecting the unit 1 to one end of a rotatable shaft 5 which is connected via gearing (not shown) to the telescopic support legs 4a which are preferably wheeled as shown in FIG. 2. Preferably this latter means includes a nut 6 fixedly attached to one end of the shaft 5 in any convenient manner such as by welding. This nut 6 co-operates with a correspondingly shaped drive socket 7 to rotate the shaft 5 one way or the other to extend or retract the support legs 4a when the unit 1 is connected to a source of air under pressure.

To this end the unit 1 is provided with at least one inlet 8 for air under pressure. This inlet 8 is connected by a flexible air hose 9 to a male hose coupling 10 provided on a connector board 11 of the trailer 1. The board 11 also carries electrical socket connectors 11a and air brake connectors for connection to appropriate couplings on a similar board 12 on the vehicle prime mover.

The unit 1 is provided with means for reversing its direction of rotation. In the illustrated embodiment this means is a system of ports in the unit controlled by a three position turn control 1a on the unit 1 for movement between leg raise, leg lower and stop positions. However, such reversing means may be provided in any other convenient way such as a change air-direction tap in the hose 9. Moreover, the socket 7 and nut 6 connection may include flexible means for absorbing shock on starting operation of the mechanism.

To operate the drive mechanism of the invention either on coupling or uncoupling the trailer from a vehicle, the dead man lever is placed in the on position in the vehicle cab, 'up' or 'down' selected at 1a on the unit 1, the coupling 10 connected to the secondary air braking outlet 10a on the vehicle (the so-called 'Blue line') and the secondary air braking tap turned on to connect the secondary air braking system air reservoir to the unit 1. When the legs 4a have been raised or lowered as desired the secondary air braking tap is closed and the coupling 10 disconnected from the secondary air braking outlet 10a on the vehicle.

Advantageously the unit 1 operates on the end of the shaft 5 remote from the usual manual drive means 13. In this way if there is insufficient air under pressure remaining in the vehicle air reservoirs to operate the drive unit 1, the legs 4a may still be operated manually by the means 13.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. For a vehicle trailer lifting gear having two telescopic support legs at the end of the vehicle trailer couplable to a vehicle, operable via a rotatable shaft having first and second ends and gearing to vary the height of the trailer end to permit coupling to or uncoupling from a vehicle, a lifting gear drive mechanism comprising:

an air driven rotary drive unit fixedly attachable to said vehicle trailer and connectible to a source of air under pressure, said drive unit comprising a reversible socket gun drivable by air under pressure and having a drive socket, and connecting means for drivingly connecting said drive unit to said first end of said rotatable shaft so that with the mechanism in operative association with said vehicle trailer said drive unit can be connected to said source of air under pressure to rotate said shaft one way or the other to extend or retract said support legs, said connecting means including a nut fixedly connectible to said first end of said rotatable shaft for cooperation with said socket.

2. A drive mechanism according to claim 1 further comprising:

attaching means for attaching said drive unit to one of said trailer support legs,
a male hose coupling connected to said source of air under pressure, and
a flexible air hose connected at one end to said drive unit and at the other end to said male hose coupling.

3. A drive mechanism according to claim 2 wherein, said attaching means includes a bracket.

4. A drive mechanism according to claim 3 wherein, said nut is welded to said one end of said rotatable shaft,
said drive unit is bolted to said bracket,
said bracket is welded to one of said support legs,
said drive socket engages said nut, and
said male hose coupling is attached to a connector board of said trailer for connection to a secondary air braking system of said vehicle.

5. A drive mechanism according to claims 1 or 4 further comprising:

manual drive means carried on said second end of said rotatable shaft.

6. A vehicle trailer comprising:

a frame having first and second ends,
one or more wheels connected to said frame and rotatable underneath said frame proximate said first end,
coupling means connected to said second end for coupling said frame to a vehicle, and
a lifting gear assembly attached to said frame which lifts said second end of said frame for operating said connecting means,
said lifting gear assembly including one or more telescopic support legs connected underneath said frame proximate said second end,
a rotatable shaft having first and second ends operatively associated with each said support legs operably connected to each said support leg,
a lifting gear drive mechanism operatively connected to said rotatable shaft for rotation thereof,
said lifting gear drive mechanism including air driven rotary drive unit fixedly attachable to said support leg and connectible to a source of air under pressure, said drive unit comprising a reversible socket gun drivable by air under pressure and having a drive socket, attaching means for attaching said drive unit to one of said trailer support legs, connecting means for drivingly connecting said drive unit to said first end of said rotatable shaft, said connecting means including a nut fixedly connectible to said first end of said rotatable shaft for cooperation with said drive socket, and gear means operatively connected to said rotatable shaft for extending or retracting said support legs.

7. A vehicle trailer according to claim 6 further comprising:

a male hose coupling connected to said source of air under pressure, and
a flexible air hose connected at one end to said drive unit and at the other end to said male hose coupling.

8. A vehicle trailer according to claim 7 wherein, said attaching means includes a bracket.

9. A vehicle trailer according to claim 8 wherein, said nut is welded to said one end of said rotatable shaft,
said drive unit is bolted to said bracket,
said bracket is welded to one of said support legs, and
said drive socket engages said nut.

10. A vehicle trailer according to claim 9 further comprising:

a connector board attached to said male hose coupling for connection to a secondary air braking system of said vehicle.

11. A vehicle trailer according to claim 6 or 10 further comprising:

manual drive means carried on said second end of said rotatable shaft.

* * * * *